United States Patent [19]
Khoury

[11] Patent Number: 6,163,378
[45] Date of Patent: Dec. 19, 2000

[54] SPECTROSCOPIC TIME INTEGRATIVE CORRELATION FOR RAPID MEDICAL DIAGNOSTIC AND UNIVERSAL IMAGE ANALYSIS

[76] Inventor: Jehad Khoury, 33 Tan Bark Rd., Sudbury, Mass. 01776

[21] Appl. No.: 09/332,404

[22] Filed: Jun. 14, 1999

[51] Int. Cl.[7] ................................................. G01B 9/02
[52] U.S. Cl. ...................... 356/457; 356/458; 356/489
[58] Field of Search .................................. 356/348, 345, 356/349; 359/10

[56] References Cited

U.S. PATENT DOCUMENTS 5,438,439   8/1995   Mok et al. ................................. 359/10

*Primary Examiner*—Robert Kim
*Attorney, Agent, or Firm*—Robert Nathans

[57] ABSTRACT

A spectrum analyzer for producing a first two-dimensional array of time varying spectral analysis image input signals, a reference image generator for producing a second two-dimensional array of spectral analysis image reference signals, and a time-integrative correlator, which can be non-coherent or coherent, or correlating the two groups of image representitive signals to determine the degree of matching between an input image and a library reference image. The spectrum analyzer can include an interferometer, a tunable optical filter, or a time-wavelength-multiplexing holographic lens for viewing the input image. A monolithic non-holographic version provides a rugged, compact and portable image analyzer for examining many types of images.

24 Claims, 6 Drawing Sheets

SPECTROSCOPIC TIME INTEGRATIVE CORRELATION FOR RAPID MEDICAL DIAGNOSTIC AND UNIVERSAL IMAGE ANALYSIS

BACKGROUND OF THE INVENTION

This invention relates to the field of image scene analysis whereby wavelength data, emitted by numerous types of scenes and objects, are employed for obtaining information about the scene.

Fourier transform spectroscopy is one of the techniques that can be used in the area of medical tomography for tissue biopsy examination as an example, as well as in the identification and qualification of chemical compounds for environmental control. Detection and the precise location and nature of toxic waste and such conditions as diseased crops and forests have become very important. The detection and location of underground natural resources is another area of interest. In intelligence and battlefield applications, real time identification of the nature of various detected images, e.g. scenery, is of vital importance. Rapid real time image analysis can also be important for analyzing images of rapidly produced manufactured products during quality control. Thus, parallel optical digital processing would be highly desirable for many of these image analyzing applications.

Recently a special issue in *Optical Engineering* (Volume 37, 1998), has been published regarding area multi-spectra and hyper-spectra for remote scene and texture classification. The same techniques can also be applied for qualification of chemical compounds for environmental, intelligence, battlefield applications, and spectroscopic medical diagnosis. The general approach is to collect images in different wavelengths through the use the appropriate sensors, and then send these images to a data fusion center for detection and analysis. Various digital algorithmic approaches have been considered for analysis. Some of these approaches considered the use of bilinear logic and fuzzy logic; others considered the use of geometrical interpretation of a discrete wavelet transform. One of the most successful techniques used orthoganalization methods such as those of Gram-Schmidite (G-S) and the Karhunen-Loeve (K-L). While these techniques were impressive in performance, they required extensive time for calculation. Other approaches considered the Uses-Markov random field model, or neural network based on a pulse coupled neural network. The aforesaid referenced techniques employ digital algorithms and software designs which require extensive undesirable calculation time. In contrast, we employ holographic and non-holographic opto-electronic systems based on Fourier transform spectroscopy; see "Optics" Miles V. Klein, Edited by John Wiley (1969), Chapter 6 on interference spectroscopy p 219–237).

BRIEF SUMMARY OF PREFERRED EMBODIMENTS OF THE INVENTION

Therefore, in accordance with one preferred approach utilizing the present invention, a holographic opto-electronic system is provided, which is based on Fourier transform spectroscopy, to detect wavelength signatures of images being viewed such as classification and detection of biological tissue during surgery, and numerous other images in real time, and whereby holographic time-integrative correlation is combined with an imaging spectrometer, which can use a tunable interferometer or preferably a tunable holographic filter that sweeps through and scans the frequency spectrum. By using off-the-shelf instrumentation, the system processing speed is dictated by speed of the current technology of CCD (10,000 frames per sec) cameras. Future processing speeds may be substantially increased even further up to nanosecond times, based on incoherent to coherent convertors, or optically addressed spatial light modulators such as quantum well devices.

However, the invention need not necessarily employ real time holography, using photorefractive or organic materials, or for that matter parallel optical computing, particularly in non-real time applications such as medical biopsies, and may be performed in whole or in part by more conventional serial electronic computers. A non-holographic embodiment employs tandemly positioned first and second filters for processing incoherent light. This embodiment can advantageously be portable, compact and rugged. In any case, the invention involves the steps of producing a first group of numerous time varying spectral analysis input signals, each input signal of the first group representing the amplitudes of wavelength components of a picture element of the input image under examination during frequency spectrum scanning of the incoming image; and at the same time, producing a second group of time varying spectral analysis reference signals, each signal of the second group representing the amplitudes of wavelength components of a picture element of a reference image being compared to the input image; now time-integrative correlating the first and second groups of time varying signals; and thereafter producing close match output signals upon a close match between the first and second groups of time varying signals. An output image of the input image may be displayed having an intensity which is a function of the degree of matching between the input and reference images, for identifying the nature of the input images.

BRIEF DESCRIPTION OF THE DRAWINGS

The various features of the invention will become more apparent upon study of the following description taken in conjunction with the drawings in which.

DETAILED DESCRIPTION OF PREFERRED EMBODIMENTS OF THE INVENTION

Figure 1:
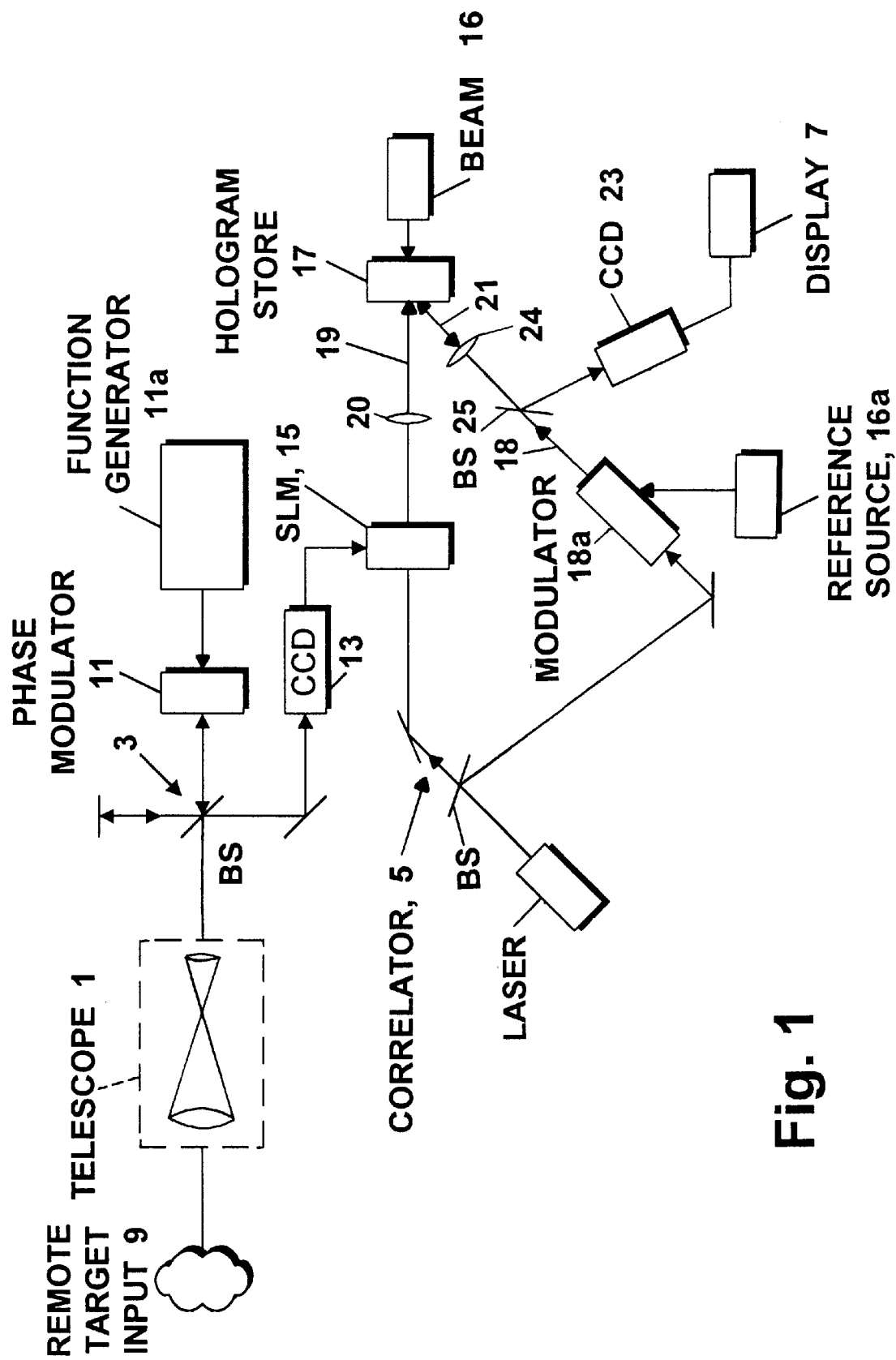
FIG. 1 shows an interferometric embodiment of the invention.

FIG. 1 shows the schematic diagram of the interferometric embodiment of the spectroscopic-time integrative correlator for automatic target recognition. The system consists of four parts: the first is an imager comprising a telescopic or endoscopic section 1, the second is an interferometer 3, which acts as spectrometer of the light coming from a remote distance, or nearby biological tissue, the third is a holographic time-integrative correlator 5, and the fourth part is the output or display system 7.

The telescopic or endoscopic imager 3 images an input object under examination 9 into the interferometer. In this case, the interferometer is a Michelson interferometer. One of the interferometer arm portions is phase modulated via a pizo-crystal or electro-optics phase modulator 11 and function generator 11a to produce a two-dimensional time-modulated image. The time modulation (the intensity v. wavelength plot) in each pixel point or picture element of the interferometer output image represent the wavelength spectral emission for its corresponding point on the input image 9. The resulting 2-D data image array is detected via CCD camera 13 and the resulting array of electrical image output waveforms of intensity v. wavelength, is fed into spatial light modulator (SLM) 15, which is situated in one arm of the holographic time integrative correlator 5 as shown. The CCD camera and SLM can be replaced by an optically addressed SLM or incoherent-to-coherent converter. The other input of the time integrative correlator is a group of numerous simultaneous time-modulated target library reference signals which group represents the spectral emission of one of a plurality of reference targets stored in the library of targets. Library image reference source 16 sequentially feeds these groups of image signals to SLM modulator 18a in the other arm portion of the time-integrative correlator 5. A grating is written on the real-time integrating holographic storage member 17, which could be a photorefractive crystal, as long as there is a time correlation between a point on the input image and the spectrum on the reference beam. See J. Khoury. Vince Ryan, Charles L. Woods, Mark Cronin-Golomb, "Photorefractive lock-in detector," Opt. Letts 16, 1442–1444 (1991). See also my original Ph.D thesis "Application of Photorefractive Nonlinear Information Processing"; Chapter 6, page 106 and Chapter 9, page 182 and 183; Essex University, England, 1989. The resulting grating in holographic store 17, produced by beams 18 and 19, is read out via a read-out beam 16 co-acting with first SLM output beam 19 transmitted from SLM 15 via lens 20, and output beam 18 modulated by modulator 18a in accordance with the aforesaid library reference image signal. Numerous groups or two-dimensional arrays of reference signals corresponding to candidate images such as biologic tissues may be sequentially fed from data storage library 16. The output from the real-time hologram stored in 17, which can be a photorefractive crystal or other holographic storage material, is imaged to a second CCD camera 23 via lens 24 and beam splitter 25. The resulting display at CRT display device 7, represents a real-time image scene classification e.g. biologic tissue, malignant cancer, or other image of interest, besides representing a potential close match between the image of the target image being inputted into the interferometer 3 and the reference target currently retrieved from library data store 16.

Thus, the output of the two-dimensional (2-D) interferometric spectrum analyzer 3, produced by CCD 13, is represented by a large group of time varying electrical signals having amplitudes proportional to the strength of the received wavelengths of light across the frequency spectrum of each input image pixel under examination, usually in a two dimensional array of image pixels. These signals are then inserted into two-dimensional SLM 15 to be compared with groups of similar reference signals, each group (2-D array) representing a reference image signal from library store 26, The time-integrative correlator 5 thus looks for a time correlated correspondence or close match between these two groups of wavelength representative time varying signals. Upon a close match condition of the groups of signals compared, the target input image can be identified, as the identity of the reference signal producing the close match condition is now known. Since modulator 18a, which is typically an SLM, can receive hundreds of groups of reference signals per second, identification of the target can be in real time which is particularly important for military applications, high speed manufacture of products being imaged for quality control, and the "eyes" of rapidly moving robots, real time image matching during surgery.

Figure 2:
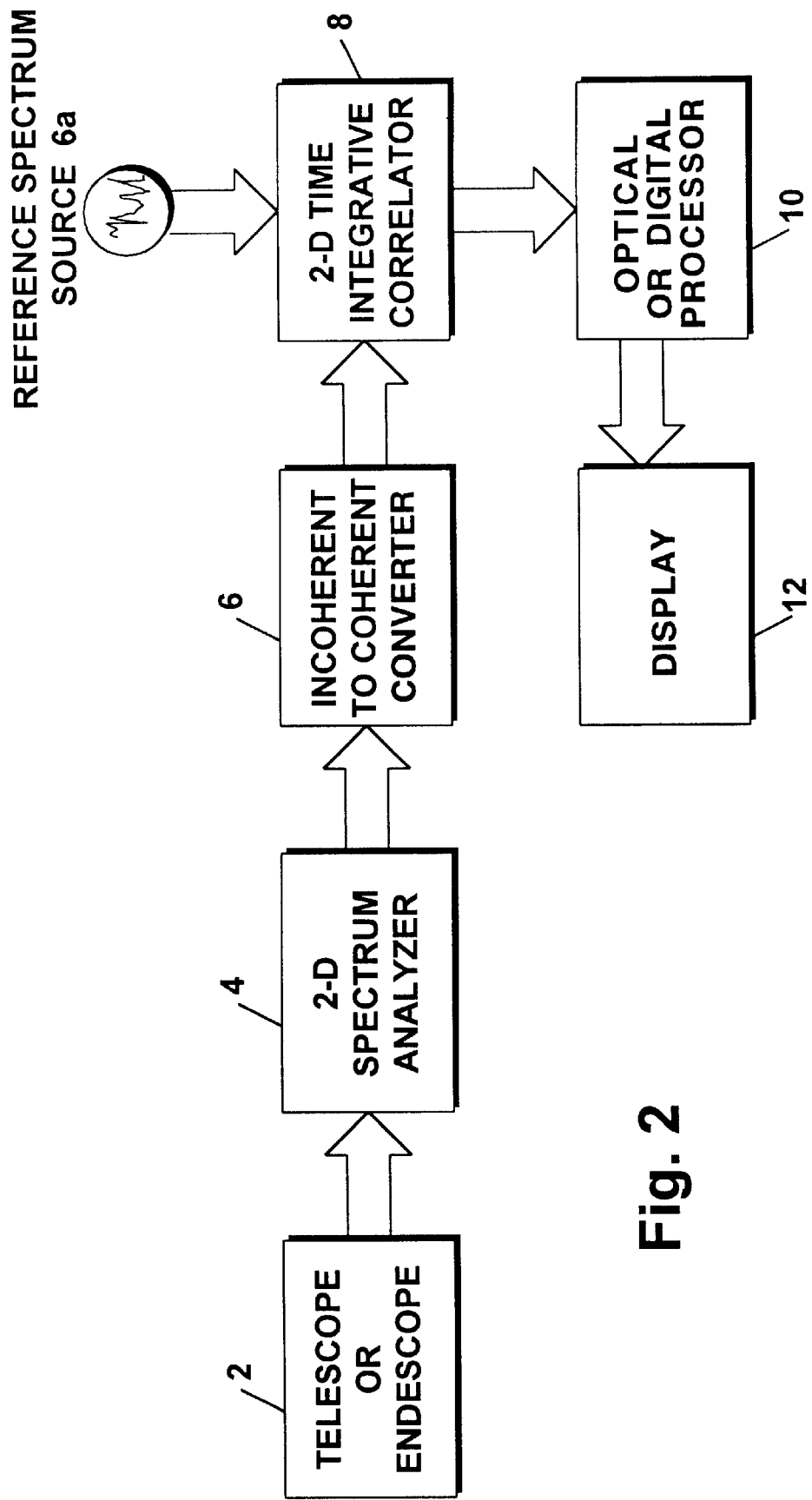
FIG. 2 schematically illustrates the invention in its more generalized sense.

FIG. 2 schematically indicates in a more general sense, the present invention. Optical image telescopic or endoscopic imager device 2 is shown, coupled to two-dimensional spectrum analyzer 4 which can correspond to interferometer 3 of FIG. 1, incoherent to coherent converter 6 corresponding to CCD 13 and SLM 15. The reference source 6a and the time-integrative correlator 8 thus corresponds to correlator section 5 of FIG. 1. Output display 12 could display the inputted image, the brightness of its pixels being determined by correlator 8 and signal interface processor 10. If the invention is practiced without an interferometric time integrating technique, or with a serial digital or analog computer, converter 6 is omitted; see FIG. 8 as an example.

The parallel optical processing approach is often superior to a serial digital or analog implementation because very high operating speeds are impossible to achieve digitally if time correlation in each pixel of the image is desired. Importantly, the time correlation approach, based on real time holography, which can be used in the practice of the invention, is adaptive to instantaneous background signature changes, where the digital approaches are not adaptive and thus adaptive realization of algorithm optimization is achievable.

Regarding parallel optical implementation of the invention, the above interferometric approach shown in FIG. 1 has some draw backs, because interferometeric devices suffer from instabilities in alignment, and therefore, an alternative approach may be superior, which uses a tunable filter, which could be holographic, for tuning the received light according to its spectrum, instead of the interferometer. An advanced design using this second approach can be achieved by combining such a holographic filter 29 of FIG. 3, and the telescope in one system by my novel design, named a "spectroscopic imager."

Figure 3:
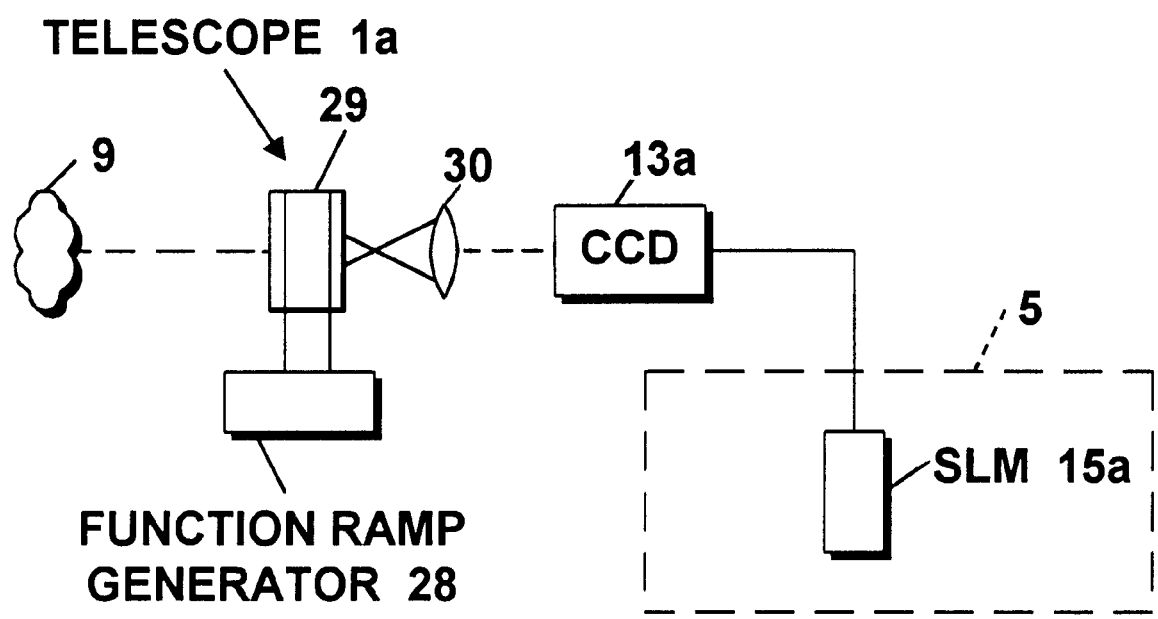
FIG. 3 illustrates another, presently more preferred, embodiment of the invention in which the interferometer and telescope of FIG. 1 are replaced by a spectroscopic telescope.

The spectroscopic telescope or imager 1a, shown in FIG. 3, is essentially an imaging system in which one of the lenses is replaced by a time-wavelength-multiplexing holographic lens 29. The holographic lens is made of tunable holographic material including electro-optic, elasto-optic, and thermally tunable materials which can store gratings with spherical fringes. The spherical fringes within the hologram makes it act like a lens. See Feng Zhao, Koichi Sayano, Harold E. Miller, Jr., and Neven Karlovac, "Sub-picometer accuracy laser wavelength sensor using multiplexed Bragg grating," IEEE photonics technology letters 9, 1493–1495 (1997); Michal Balberg, Meir Razvag, Ele Refaeli and Aharon Agranat "Electric-field multiplexing of volume holograms in paraelectric crystals", Appl. Opt. 37, 843–847 (1998). Time-wavelength de-multiplexing of the incoming image resulting in time spectroscopy is realized by having electrical waveform ramp generator 28 of FIG. 3, apply a sawtooth wave and hence a ramped electrical field across the electro-optic holographic lens 29. The light emitted from holographic lens 29 is then relayed via lens 30 to the first CCD camera 13a corresponding to 13 of FIG. 1. The output of CCD camera 13a is then fed to SLM 15a of the aforesaid time integrative correlator 5, which has already been described.

Two approaches can be used for fabricating this holographic lens. The first approach is based on fixing a grating in the aforesaid tunable materials. The photorefractive material can be ferroelectric, or polymer in nature. The second approach can be achieved by constructing a stack of layers from different tunable electro-optic materials such as the electro-optic material GaAs or GaAlAs, on a convex or concave mirror lens. If the system is designed in conjunction with an endoscope, the electro-optic grating can be replaced by a tunable fiber-Bragg grating. Such a tunable grating has been disclosed in H. Mavoori et al., "Enhanced Thermal and Magnetic Actuation for Broad-range Tuning of Fiber Bragg-based Reconfigurable Add-Drop Device"; Opt.Letts. 24, 714–716 (1999).

Thus, in the FIG. 3 design, the interferometer 3 and the telescopic system of FIG. 1 are replaced by the spectroscopic imager which could be a telescope. The spectroscopic telescope images the remote target or input image 9 into the camera 13a and also acts as a wavelength spectrum analyzer of the input image by converting its wavelength presentation into a time presentation. The spectroscopic representation of the input image using a hologram system is different than that of the interferometric system, and essentially is related to the mechanism of coupled electromagnetic field of that specific materials used to store the fringes. FIG. 3 shows the spectroscopic-time-integrative correlator for automatic target recognition using the spectroscopic telescope. Alternatively, an endoscopic fiber-optic imager could be used for surgical applications in place of the telescope.

Fourier transform spectroscopy is well known to those skilled in the art, and may be found in standard text books of physical optics. See for example,"Optics" Miles V. Klein, Edited by John Wiley (1969); (Chapter 6 on interference spectroscopy p 219–237). For an illustration of Fourier transform spectroscopy let us look, for example, at Michelson interferometer output The interferometer output is given by the following equation:

$$I_{out} = I_1 + I_2 + 2I_1 I_2 \cos \frac{4\pi v d}{c} = I_0 \left(1 + \gamma \cos \frac{4\pi v d}{c}\right) \quad (1)$$

Where $I_1$ is the intensity of the light in one arm of the interferometer, and $I_2$ is the intensity of the light in the other arm of the interferometer, v and c are the frequency and the speed of the light respectively, d is the optical path difference between the two paths, γ is the interference contrast defined as:

$$\gamma = \frac{2I_1 I_2}{I_1 + I_2} \quad (2)$$

Suppose now that the coherent light is replaced by white light, then the output of the system can be written in the following form.

$$I_{out} = \int \left(T_1(v)S(v) + T_2(v)S(v) + 2t_1 t_2 S(v)\cos \frac{4\pi v d}{c}\right) dv \quad (3)$$

Where T and t are the transmissivity of the respective arm in terms of intensity and amplitude, S(>) is the power spectrum of the input beam at that frequency.

Let consider the case in which the effective path difference is variable in time by a ramp, d=vt; where v is the velocity of the fringes, then the interference output can be written in the following form.

$$I_{out} = \int \left(T_1(v)S(v) + T_2(v)S(v) + 2t_1 t_2 S(v)\cos \frac{4\pi v v t}{c}\right) dv \quad (4)$$

Suppose now that we want to perform time spectral analysis of the interferometer output. Then the spectral analysis is given by $$I_{out}(\omega) = I_{out} e^{-j\omega t} d\omega \quad (5)$$

This is given by $$I_{out}(\omega) = \delta(\omega)\left(\int (T_1(v)S(v) + T_2(v)S(v)dv)\right) + \quad (6)$$
$$\frac{1}{2}\int t_1 t_2 S(v)\left(\delta\left(\omega + \frac{vv}{c}\right) + \delta\left(\omega - \frac{vv}{c}\right)\right) dv$$

$$I(\omega) = \delta(\omega)\left[\int (T_1(v)S(v) + T_2(v)S(v)dv)\right] + \frac{ct_1 t_2}{4|V|}\left[S\left(-\frac{\omega c}{2v}\right) + S\left(\frac{\omega c}{2v}\right)\right] \quad (7)$$

As evident from the above equation, the time spectral analysis of the interferometer output consists of a DC term, determined by the total integrated intensity incident on the output detector, and a time spectrum which is equivalent to the wavelength spectrum of the coming light. The only difference is that the time spectrum is scaled by the ratio of the light velocity to the fringe velocity.

We have shown that interferometric spectroscopy is achieved via tuning the optical path length in time, producing a subsequent constructive interference according to the wavelength of the input image light. In contrast, holographic spectroscopy is achieved via changing the effective fringe spacing in time by making a different Bragg match according to the wavelength. In this section we are going to illustrate the mechanism of this spectroscopy by using a modified version of a commercially available "Accuwave" Inc. holographic filter.

Figure 4:
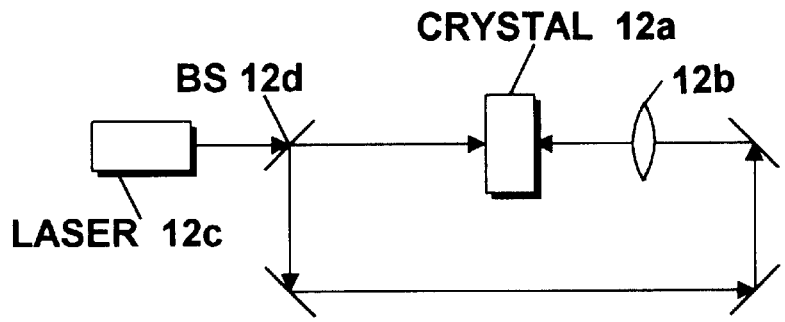
FIG. 4 shows aspects of the development of a superior tunable filter.

Regarding holographic filters: recently a 0.0125 nm (FWHM) band width optical filter has been constructed by Accuwave Inc. See Shizhuo Yin, Brett D. Guenther and Francis T. S. Yu, "Narrow pass filtering using multiple gratings," Photorefractive fiber and crystal devices: Materials, optical properties and applications, Edited by Francis T. S. Yu, Volume 2526 (1995). This filter has a through output of 10%, clean side-bands and a response roll-off of 40 dB/decade. The filter has been developed by recording and fixing a grating in the electro-optic holographic storage member 12a in the back propagation geometry as shown in prior art FIG. 4. Lens 12b generates a spherical wavefront interacting with the plane wave from laser 12c and beam splitter 12d to the left of the crystal 12a, in order to generate a tunable holographic lens. This filter showed superiority over conventional filtering approaches in terms of field of view and tunability, and already has been employed in the areas of astronomy and wavelength division de-multiplexing for communication and holographic storage. In addition, this filter has potential for application in other areas, such as solar systems, atmospheric sciences, spectroscopy, lidar, terrestrial remote sensing, radar, phase array antenna, signal processing, multi-channel communication networking, medical tomography and finally in characterization of chemical compounds for environmental intelligence.

Figure 5:
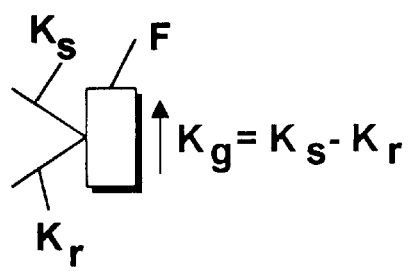
FIGS. 5 and 6 show certain aspects of a narrow spectral bandwidth holographic filter that can be employed in the practice of the present invention.
Figure 6:
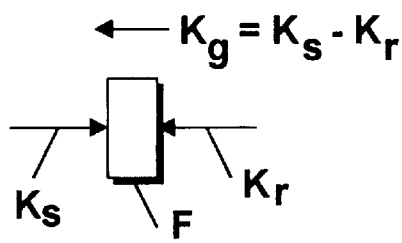

FIGS. 5 and 6 show schematic diagrams of a narrow spectral bandwidth holographic filter. The filter member F is constructed by the interference between reference and signal beam in holographic media thereby generating wave vector grating $$K_g = K_r - K_s,$$

where $k_g$ is the wave vector of the grating, $k_r$ is the wave vector of the reference beam and $k_s$ is the wave vector of the signal beam. The filter can be either in the transmission geometry or in the refection geometry as shown in FIG. 5 and FIG. 6, respectively.

During the read-out process, the grating is illuminated by a beam. The only light which transmitted (as in the case of the transmission geometry) or reflected (as in the case of the reflection geometry) is the light which satisfies the Bragg condition. The grating will diffract light only within a narrow set of wavelengths and angular conditions. This property is used in the holographic filter to obtain the sharp spectral response. For the described spectroscopic application, the filter normally needs to be tunable over a wide-band of wave length, and therefore some modification of the filter is desired.

The above holographic filters are tunable in their response to the wavelength. This tunability is achieved by applying an external field or changing the temperature of the filter. In both cases, this tunability is limited over a small band of the wavelengths. For increasing the tunability of the holographic filter, it is recommended to record gratings by a combination of wavelength and electrical multiplexing; see Michal Balberg, Meir Razvag, Ele Refaeli and Aharon Agranat, "Electric-field multiplexing of volume holograms in paraelectric crystals", Appl. Opt. 37, 843–847 (1998). In this combined multiplexing (utilizing tunable laser such as a dye), many gratings are recorded each corresponding with a different wavelength as well as a different electrical field. The tunability is achieved usually in any holographic materials with a large electro-optic coefficient. Tunability over a large dynamic range is realized in holographic materials with quadratic electro-optic effect such as $KnBO_3$.

Regarding time-integrative correlation, a first approach is the one which employs the CCD camera as the time integrative device. A second approach uses the real-time hologram as a time integrative device; see J. Khoury, Vince Ryan, Charles L. Woods, and Mark Cronin-Golomb, "Time correlation motion detection," Optics Communications 85, 5–10 (1991). The drawback in the first approach is that the time integrative correlation result is associated with unseparated DC background. This fact means that the time integrative correlation, using the CCD camera, is not practical for many applications. Therefore in accordance with our invention, we employ the time integrative correlator which uses the real-time hologram as the time integrative device. Almost any real-time holographic media can be used for time integration as long as the input signal has frequencies in which the real-time holographic media can't follow. Currently there are many real-time holographic media which can be used for these purposes. Examples include photorefractive, biological materials such as bacteriolrhodopsin and organic materials.

Some of the photorefractive real time holographic materials have response time in the msec range, which make them very suitable for designs providing image integration of information coming out of the CCD at 10,000 frames/sec; see "Engineering solution for design and manufacturing;" NASA Tech Brief, Vol.22 No. 4, April 1998. Other holographic materials which operate in the usec time are not suitable for this application, simply because they can't integrate. For this reason we have illustrated devices such as hologram store 17 of FIG. 1 which use photorefractive materials as the time-integrative devices.

Figure 7:
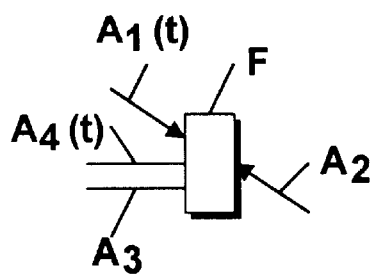
FIG. 7 schematically illustrates the architecture of the time integrative correlator, with a four wave mixing arrangement.

FIG. 7 shows the architecture of the time integrative correlator. In this configuration three beams $A_1$ $A_2$ and $A_4$ intersect within, for example, a photorefractive crystal corresponding to hologram storage member 17 of FIG. 1. $A_1$ and $A_4$ are coherent so they combine to induce a hologram within the material; while $A_2$ is coherent within itself but not with $A_1$ and $A_4$. $A_2$ reads the grating which is generated by $A_1$ and $A_4$, thereby generating a beam which is the conjugate of $A_4$. Assuming that the spectrum of $A_1$ is given by $S_1(T')$, and the spectrum of beam 4 is given by $S_4(T'')$, then the output, beam $A_3(t)$, is given by equation (8):

$$A_3(t) = \frac{\gamma l A_2}{I_0 \tau} \int_{-\infty}^{\infty} \int_{-\infty}^{\infty} \frac{S_1(\omega')S_2(\omega'')}{-(\omega' - \omega'') + \frac{1}{\tau}} \exp[-i(\omega' - \omega'')d\omega' d\omega'']$$

Where $\tau$ is the response time of the photorefractive material, $I_0$ is the total intensity incident on the crystal and $\gamma$: is the coupling coefficient of the material. L is the crystal thickness.

It is evident from Eq. 8 that the time-integrative correlation result is inversely proportional to the total intensity incident on the crystal. This phenomena is the origin of implementing many adaptive optimal correlation algorithms.

Figure 8:
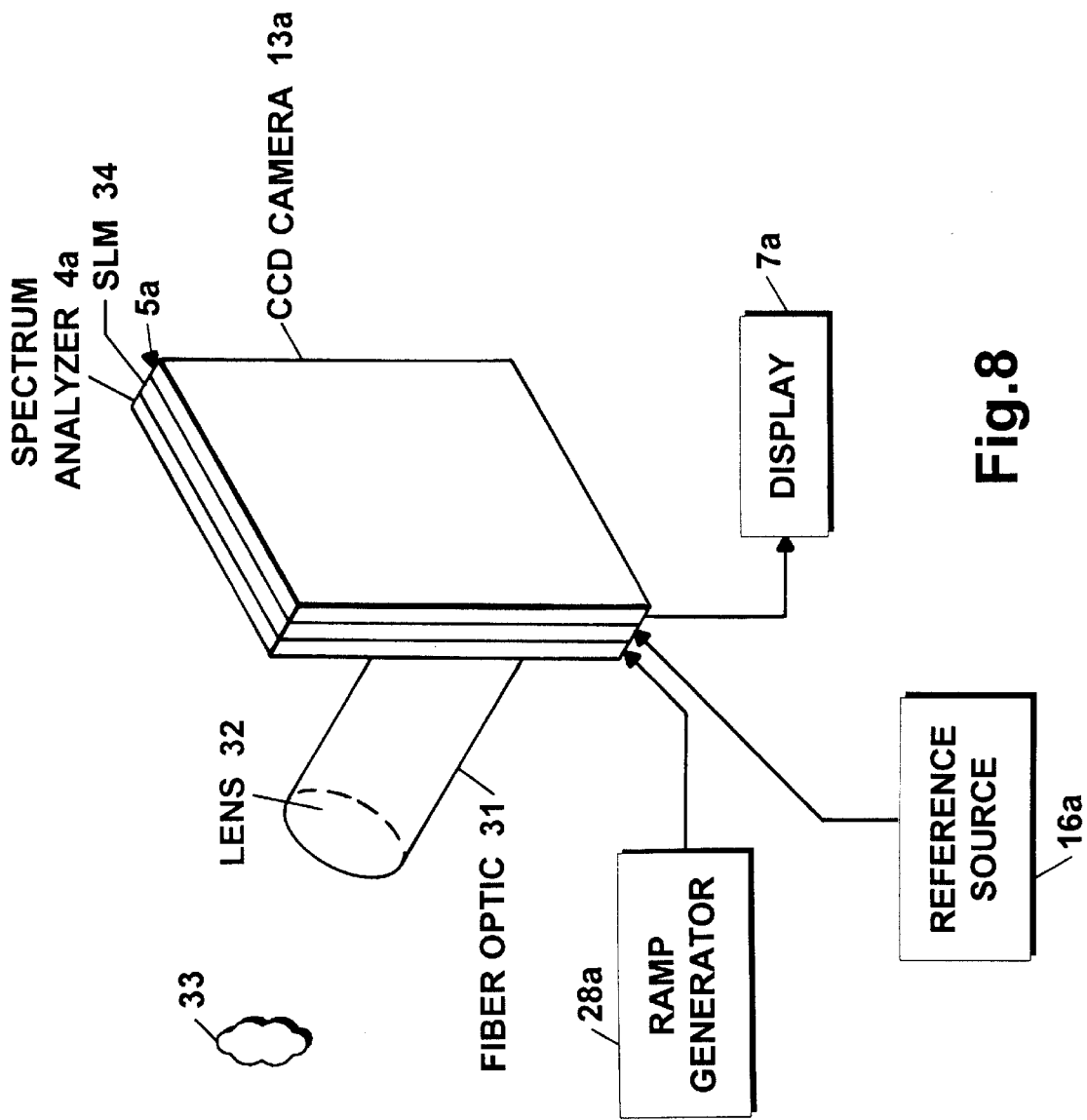
FIG. 8 illustrates a compact, rugged and portable tandem filter embodiment of the present invention, which does not employ coherent light.

In accordance with the non-holographic embodiment of FIG. 8, which need not include a holographic filter or processing of coherent light, an endoscope including fiberoptic bundle 31 and lens 32, projects an image of a tissue under examination such as a colon situated polyp 33, upon two-dimensional spectrum analyzer 4a similar to analyzer 29 of FIG. 3, Ramp generator 28a causes spectrum analyzer 4a to scan through the wavelength spectrum, transmitting optical signals to spatial light modulator SLM 34, coupled to CCD camera 13a, which can act as a display. In the first case, SLM 34 can be a smart pixellated array which functions as a time integrative correlator, or in the second case, a time-wavelength tunable filter. In the first case, the electronic library template image reference source 16a functions to modulate each individual pixel with a time varying scanning reference signal as described previously in connection with source 16. The result is to provide two tunable, electro-optic wavelength filters 4a and 34 coacting together, preferably in series or tandem relationship, to produce a CCD camera output signal for correlating the aforesaid first and second groups of time varying wavelength indicating signals being correlated over the scanning interval. These smart-pixellated SLMs allow light pixel signals to be received from the spectrum analyzer in parallel by the correlator SLM optically, processed directly on the SLM chip in accordance with reference image signals, and then ported off to be applied directly in parallel to the CCD camera. Thus, data processing speeds can be very high. For further background on the known, prior art smart-pixellated SLM, reference may be made to U.S. Patent to Khoury et al., U.S. Pat. No. 5,859,713, entitled "Imaging in a Scattering Medium using Photon Density Waves", see col. 3 and 4 and the references therein.

Figure 9:
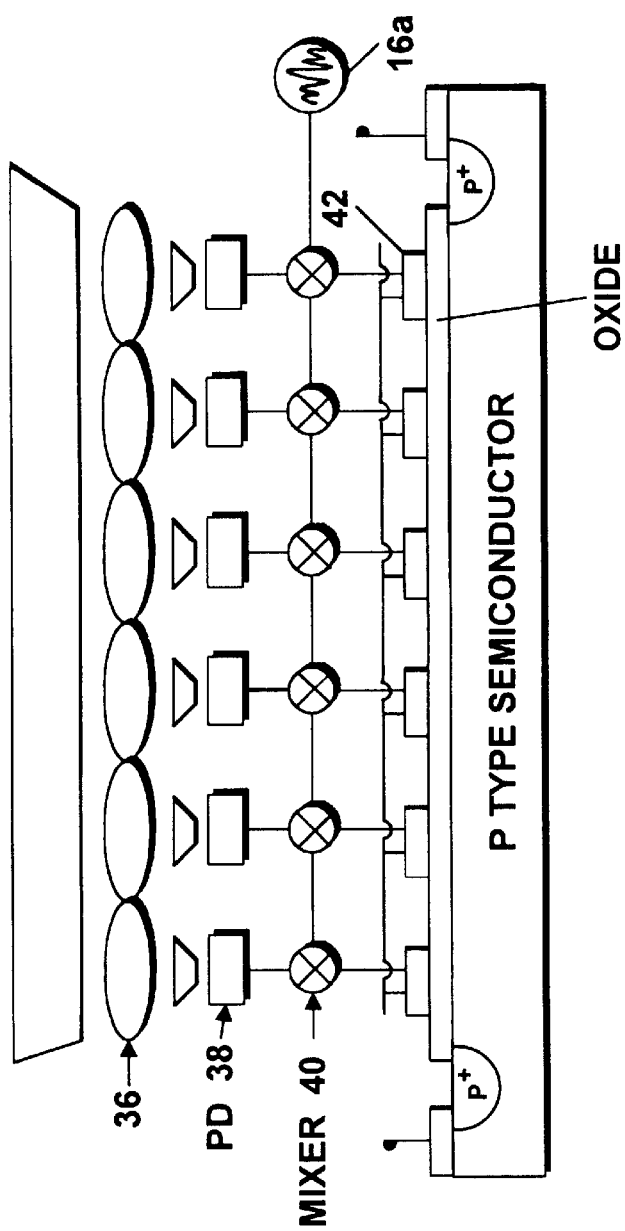
FIGS. 9 and 10 illustrate two smart pixel configurations, which can be used for implementation of a smart pixel SLM described in connection with FIG. 8.
Figure 10:
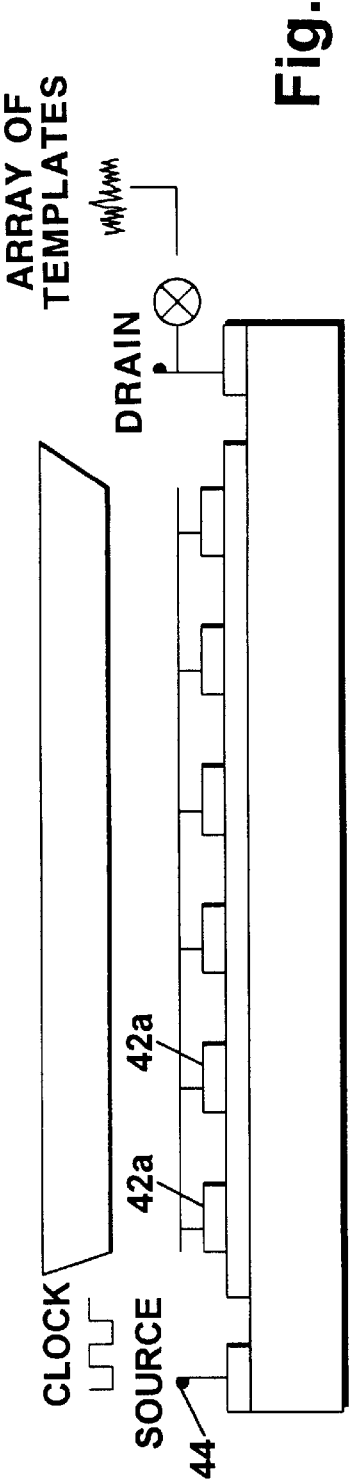

In the smart pixel SLM configuration of FIG. 9, light emerging from the spectrum analyzer is focuses by lens array 36 upon an array of photodetectors 38, the electrical outputs thereof being mixed by mixer 40 with the electronic reference library or template signals from reference source 16a. The mixed output from each pixel mixer sub-unit of mixer 40 is coupled electronically to an associated one of CCD array pixel receptors 42. In the alternative, this pixel transfer could be conducted by converting the mixer outputs to light, via an LED array, to in turn be optically coupled to a CCD camera. Although these components could be integrated into one compact structure, I believe that degradation of the image resolution might result, and thus the FIG. 10 arrangement might be more practical. In FIG. 10, imaging light is directly received by CCD photodetector array 42a, and mixing with the reference template signals from the reference source occurs serially rather than in parallel as in FIG. 9, and the template frequency is synchronized with the clock frequency of the timing signal applied to the source 44. However, this design might have a low processing speed, and thus I currently favor using a design whereby SLM 34 is a wavelength tunable filter, rather than the FIGS. 9 and 10 arrangements. The conventional CCD camera structure, having capacitive impedance, inherently time integrates these mixed signals. If the CCD camera is not slow enough to provide time integration, then an additional prior time integrative circuit can be employed.

In the aforesaid second case, where the SLM 34 is a wavelength tunable filter, time integrative correlation is produced by the wavelength tunable filter, (actually a 2-D array of filters), and the CCD camera, whereby the CCD camera executes two roles simultaneously, namely time integration and display of the output. The second filter, SLM 34 becomes highly transmissive and is switched only if the Bragg match condition matched the spectrum of the light from the spectrum analyzer. A high degree of image correlation results in a high light transmissivity of the second filter, and thus a high intensity input to the CCD camera. Besides being fast, this highly efficient arrangement should be compact, rugged and portable and thus quite practical for many uses.

While various embodiments of the invention have been described, other embodiments will become apparent to the skilled worker in the art, and thus the scope of the invention is to be limited solely by the terms of the following claims and art recognized equivalents thereof For example, the 2-D time spectrum analyzer can include a tunable et al on, or a stack layer made of electro-optic materials. The term "tunable filter" below can comprise an electro-optic filter, or tunable Bragg gratings in fiber bundles for endoscopes. The incoherent to coherent convertor 6 of FIG. 2, if used, can consist of an optically addressed spatial light modulator, or a CCD camera and an electronically addressed spatial light modulator. The time integrative correlator can involve real time holographic integrative correlation; four wave mixing; two wave mixing; a self pumped beam configuration, or a CCD camera with a signal beam modulated smart pixilated electro-optic array, with internal clocking as described in the last mentioned embodiment. Reference image signal source 16 of FIG. 1 could rapidly sequentially apply many groups of reference signals to correlator 5, representing numerous candidate images such as biologic tissues viewed during surgery, or military targets for very high speed image recognition applications, or alternatively, could present only one such group representing a single reference image such as the required surface configuration of a single electronic chip for a quality control pass or fail determination. The term "picture element" can include an image portion larger than a conventional pixel, as the term is ordinarily used.

I claim:

1. Method of determining the nature of an image under examination having numerous picture elements comprising the steps of:

(a) producing, over a wavelength scanning time interval, a first group of sequentially generated time varying spectral analysis input signals representing intensities of at least several wavelength components of said numerous picture elements of said image under examination during frequency spectrum scanning thereof;

(b) producing a second group of time varying spectral analysis reference signals representing the intensities of wavelength components of said numerous picture elements of a reference image being compared to said input image; and (c) correlating said first and second groups of time varying spectral analysis signals.

2. Method of claim 1 including the step of producing a close match output signal upon production of a close match indication, resulting from execution of step (c), between said first and second groups of time varying spectral analysis signals.

3. Apparatus for determining the nature of an input image under examination comprising:

(a) a spectrum analyzer for producing a first group of time varying spectral analysis input signals over a wavelength scanning time interval, each input signal representing the amplitudes of at least several wavelength components of a picture element of said image under examination during wavelength scanning thereof;

(b) a reference image generator for producing a second group of time varying spectral analysis reference signals representing the amplitudes of at least several wavelength components of said numerous picture elements of a reference image being compared to said input image; and (c) a time-integrative correlator for correlating said first and second groups of time varying spectral analysis signals.

4. Apparatus of claim 3 including output signal means for producing a close match output signal upon a close match between said first and second groups of time varying spectral analysis signal.

5. Apparatus of claim 4 wherein said spectrum analyzer includes a tunable interferometer for producing said first group of input signals by tuning over time the relative optical path lengths between light beams traversing different arm portions of said interferometer.

6. Apparatus of claim 4 wherein said spectrum analyzer includes a tunable filter.

7. Apparatus of claim 4 wherein said spectrum analyzer includes a spectroscopic imager having a time-wavelength-multiplexing electro-optic holographic lens and tuning means for applying a varying field across said holographic lens.

8. Apparatus of claim 4 wherein said time-integrative correlator includes a real time holographic storage member for time integration of interference patterns between said first and second groups of signals applied thereto.

9. Apparatus of claim 3 wherein said spectrum analyzer includes a tunable interferometer for producing said first group of input signals by tuning over time the relative optical path lengths between light beams traversing different arm portions of said interferometer.

10. Apparatus of claim 9 wherein said time-integrative correlator includes a real time holographic storage member for time integration of interference patterns between said first and second groups of signals applied thereto.

11. Apparatus of claim 3 wherein said spectrum analyzer includes a tunable filter.

12. Apparatus of claim 7 wherein said spectrum analyzer includes a spectroscopic imager having a time-wavelength-multiplexing holographic electro-optic lens and tuning means for applying a varying field across said holographic electro-optic lens.

13. Apparatus of claim 12 wherein said time integrative correlator includes a smart pixellated spatial light modulator.

14. Apparatus of claim 11 wherein said time-integrative correlator includes a real time holographic storage member for time integration of interference patterns between said first and second groups of signals applied thereto.

15. Apparatus of claim 3 wherein said time integrative correlator includes a smart pixellated spatial light modulator.

16. Apparatus of claim 3 wherein said time-integrative correlator includes a real time holographic storage member for time integration of interference patterns between said first and second groups of signals applied thereto.

17. Apparatus for determining the nature of an image under examination comprising:
   (a) a spectrum analyzer for producing a first two-dimensional array of time varying spectral analysis input signals during a wavelength scanning interval, each signal of said first array representing the intensities of at least several wavelength components of a picture element of said image under examination during wavelength scanning thereof;
   (b) a reference image generator for producing a second two-dimensional array of time varying spectral analysis reference signals during said wavelength scanning interval, each reference signal of said second two-dimensional array representing the intensities of at least several wavelength components of a picture element of said second two-dimensional array of time varying spectral analysis reference signals; and
   (c) correlator means for correlating said first and second arrays of time varying signals during said wavelength scanning interval.

18. Apparatus of claim 17 wherein said first and second two-dimensional arrays of time varying signals correlated by said correlator comprise pixels of light directed at a holographic storage element.

19. Apparatus of claim 18 wherein said spectrum analyzer includes a tunable optical bandwidth filter.

20. Apparatus of claim 17 wherein said spectrum analyzer includes a tunable optical bandwidth filter.

21. Apparatus which need not employ coherent light, for determining the nature of and classifying an image under examination comprising:
   (a) a spectrum analyzer for producing a first group of time varying spectral analysis light signals over a scanning time interval, said first group representing the amplitudes of at least several wavelength components of numerous picture elements of said image under examination during wavelength scanning thereof;
   (b) a reference image generator for producing a second group of spectral analysis reference signals over a scanning time interval, said second group representing the amplitudes of at least several wavelength components of numerous picture elements of a reference image being compared to said input image;
   (c) a spatial light modulator for receiving spectral analysis light signals from said spectrum analyzer and for modulating said spectral analysis light signals in accordance with said reference signals from said reference image generator; and
   (d) a CCD camera coupled to said spatial light modulator.

22. The apparatus of claim 21 wherein said spatial modulator comprises a smart pixellated spatial light modulator functioning as a time integrative correlator.

23. The apparatus of claim 22 wherein said smart-pixellated spatial light modulator is positioned between said CCD camera and said spectrum analyzer, and further including an endoscopic fiber-optic cable abutting said spectrum analyzer.

24. The apparatus of claim 21 wherein said spatial light modulator comprises a tunable filter for producing time integrative correlation with said CCD camera.

* * * * *